(12) United States Patent
Sanderson et al.

(10) Patent No.: US 8,632,073 B2
(45) Date of Patent: Jan. 21, 2014

(54) METHODS AND APPARATUS FOR A SEAL

(75) Inventors: Terry M. Sanderson, Tucson, AZ (US); Cesar Sanchez, Tucson, AZ (US)

(73) Assignee: Raytheon Company, Waltham, MA (US)

(*) Notice: Subject to any disclaimer, the term of this patent is extended or adjusted under 35 U.S.C. 154(b) by 1589 days.

(21) Appl. No.: 12/135,444

(22) Filed: Jun. 9, 2008

(65) Prior Publication Data
US 2008/0303219 A1   Dec. 11, 2008

Related U.S. Application Data

(60) Provisional application No. 60/942,734, filed on Jun. 8, 2007.

(51) Int. Cl.
*F16J 15/02* (2006.01)

(52) U.S. Cl.
USPC .............. 277/312; 277/630; 277/917

(58) Field of Classification Search
USPC .............. 277/312, 630, 650, 917, 924
See application file for complete search history.

(56) References Cited

U.S. PATENT DOCUMENTS

| 7,611,502 B2* | 11/2009 | Daly | 604/411 |
| 7,896,859 B2* | 3/2011 | Daly | 604/410 |
| 2007/0093775 A1* | 4/2007 | Daly | 604/414 |
| 2007/0112323 A1* | 5/2007 | Daly | 604/411 |
| 2011/0163119 A1* | 7/2011 | Nyambi et al. | 222/1 |

* cited by examiner

*Primary Examiner* — Gilbert Lee
(74) *Attorney, Agent, or Firm* — Thorpe North & Western LLP

(57) ABSTRACT

Methods and apparatus for a seal according to various aspects of the present invention include a seal operating in conjunction with a housing and a removable cover. A portion of the seal is attached to the housing and another portion of the seal is attached to the removable cover to enclose a joint between the housing and the removable cover. A cutter cuts the seal, which allows the removable cover to be removed.

20 Claims, 4 Drawing Sheets

METHODS AND APPARATUS FOR A SEAL

CROSS-REFERENCES TO RELATED APPLICATIONS

This application claims the benefit of U.S. Provisional Patent Application No. 60/942,734 filed Jun. 8, 2007, and incorporates the disclosure of the application by reference.

BACKGROUND OF INVENTION

Sensitive components within a housing, such as optics assemblies, often require protection from damage during storage. One solution is to place a cover over the housing. The cover itself may not be sufficient to prevent all types of damage, such as that caused by moisture or air. To protect against all types of damage, a seal may placed between the housing and the cover. Common types of seal are gaskets or elastomeric o-rings that provide protection from dust, air, and moisture.

One problem with these types of seals, however, is that over time, the elastomer portion of the seal may adhere to plastic or metal surfaces, causing the cover to stick to the housing. In applications where the cover is removed through non-manual methods, sticking of the cover may result in either a delayed removal of the cover or the cover may not come off at all. In guidance or navigation applications, the failure or delay of the cover to come off may cause a complete failure of the device or mission.

One solution to the sticking problem is to increase the force at which the cover is removed, such as by increasing the ejection spring force of the system used to remove the cover. Increasing the spring force may not always be an option, however, if the available structure is not capable of withstanding the forces associated with increasing spring size or ejection force.

SUMMARY OF THE INVENTION

Methods and apparatus for a seal according to various aspects of the present invention include a seal operating in conjunction with a housing and a removable cover. A portion of the seal is attached to the housing and another portion of the seal is attached to the removable cover to enclose a joint between the housing and the removable cover. A cutter cuts the seal, which allows the removable cover to be removed.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various covers, housings, springs, latches, and the like, which may carry out a variety of functions. In addition, the present invention may be practiced in conjunction with any number of ballistically fired projectiles such as countermeasures, interceptors, missiles, or rockets, and the system described is merely one exemplary application for the invention. Further, the present invention may employ any number of conventional techniques for covering sensitive equipment, ejecting covers, launch systems, and the like.

Figure 1:
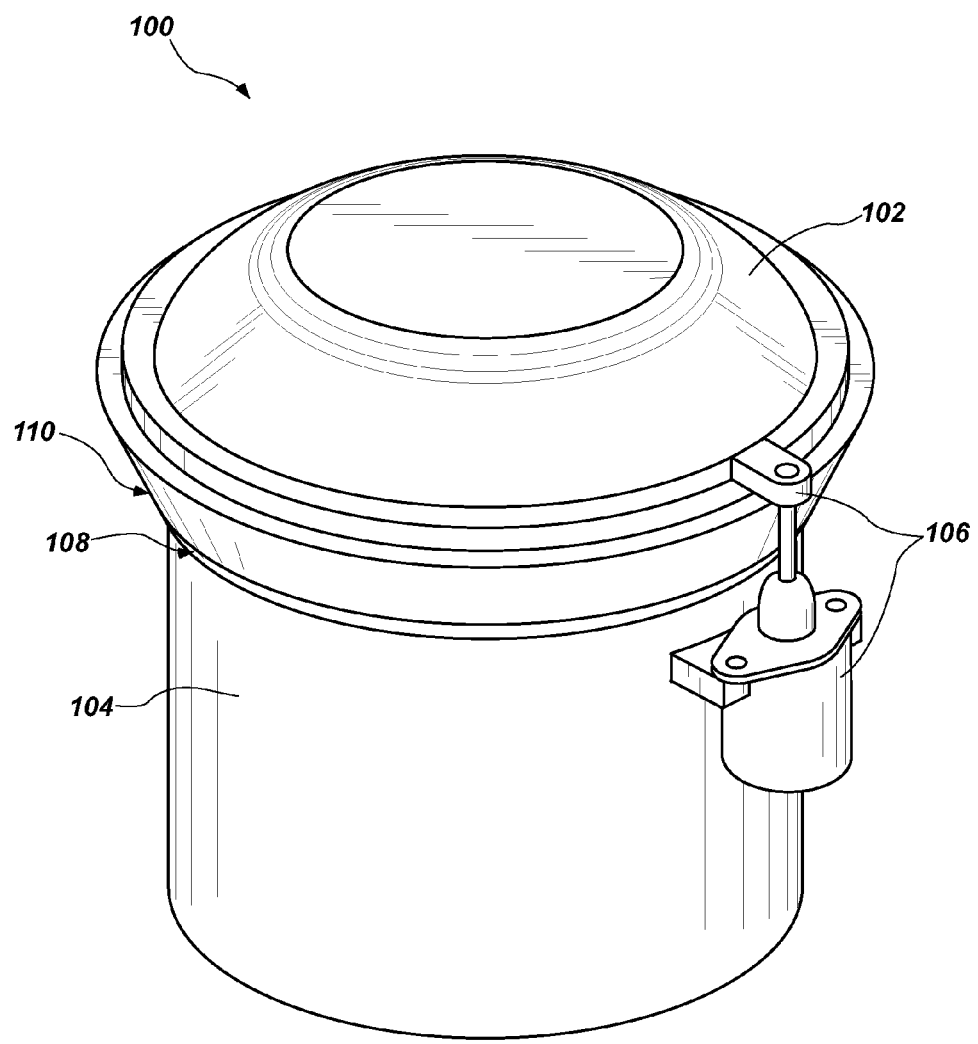
FIG. 1 representatively illustrates an optics assembly in accordance with an exemplary embodiment of the present invention.

Various representative implementations of the present invention may be applied to systems for launching and guiding projectiles. Certain representative implementations may include, for example, cylindrical bodies, canisters, and tubes. Referring now to FIG. 1, methods and apparatus for metal foil seal according to various aspects of the present invention may operate in conjunction with an optics assembly 100, an optics assembly cover 102, and a housing 104. The optics assembly 100 may comprise a joint 108 between the optics assembly cover 102 and the housing 104 which may necessitate a seal 110 to prevent foreign object debris from entering into the optics assembly.

The optics assembly 100 provides information relating to the surrounding environment to another system, such as a guided missile. The optics assembly may comprise any suitable system that is responsive to light waves in the visible and/or non-visible spectra such as electromagnetic radiation detecting systems, laser guided seekers, digital camera lenses, optical positioning sensors, photodiode detectors, focal plane arrays, photodiodes, and the like. In one embodiment, the optics assembly 100 comprises an infrared seeker attached to a projectile. In alternative embodiments, the optics assembly 100 may be replaced with another system to be covered and sealed, such as sensitive instruments or materials subject to contamination or spoilage.

The housing 104 at least partially encloses the internal components of the optics assembly 100. The housing 104 may comprise any system configured to enclose optical components, such as a tube, a canister, or a box. The housing 104 may at least partially shade the interior optics from light sources, such as the sun. For example, the housing 104 may extend beyond an interior element, such as a lens, which shades the lens from light sources outside a selected angle relative to the direction the lens is facing.

Figure 2:
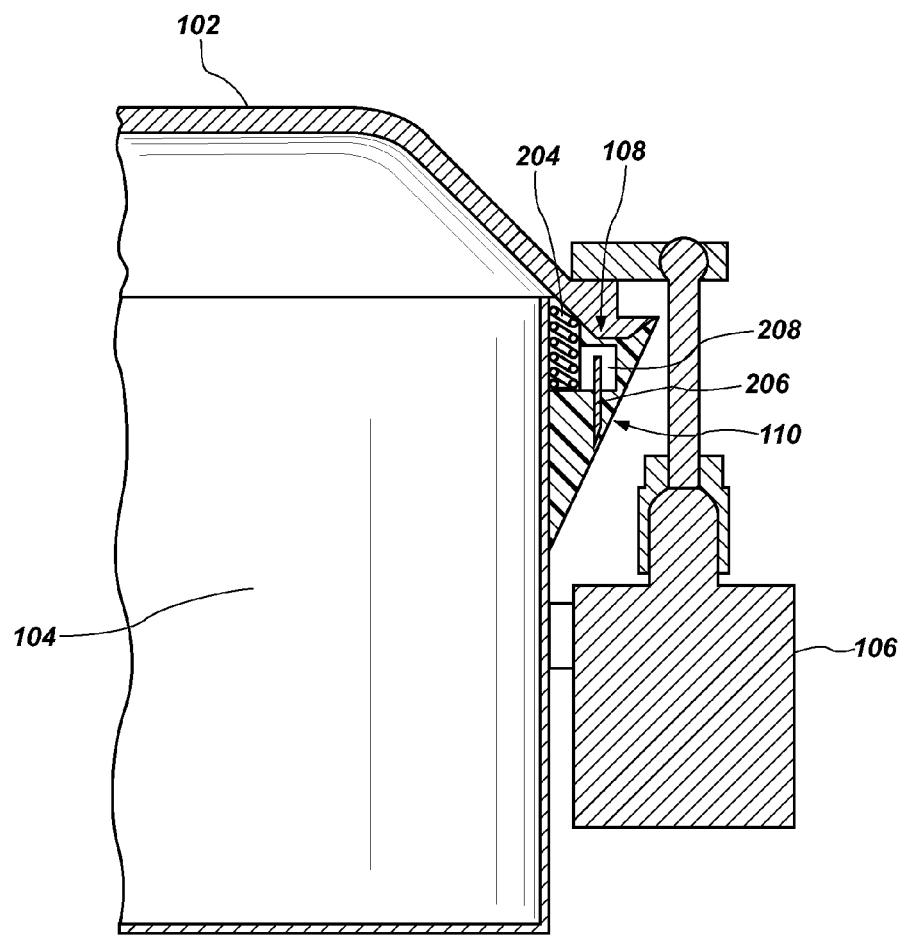
FIG. 2 representatively illustrates a cross sectional view of a retention system in the engaged position in accordance with an exemplary embodiment of the present invention.

The housing 104 may comprise any suitable materials such as metals, metallic alloys, carbon or graphite composites, hardened plastic, or other similarly rigid material capable of withstanding forces associated with launched projectiles. Referring to FIGS. 1 and 2, the housing 104 may comprise a cylindrical aluminum tube configured with at least one open end that provides the optical components access to the environment. The housing 104 may further comprise a retention system 106, an ejection spring 204, and a cutter 206.

The retention system 106 holds the optics assembly cover 102 against the open end of the housing 104 during storage or prior to use. The retention system 106 may comprise any suitable system for selectively retaining the optics assembly cover 102 against the housing 104, such as a lock, clip, notch, coupling or the like. The retention system 106 may also actively respond to a command and cease retention of the optics assembly cover 102. For example, referring again to FIG. 1, the present retention system 106 comprises a single latch assembly configured to securely retain one end of the optics assembly cover 102 to the housing 104. The latch assembly may force the optics assembly cover 102 against the housing 104 when engaged. The latch assembly may further disengage the optics assembly cover 102 on command, such as by an electrical signal. In an alternative embodiment, the retention system 106 may comprise multiple latch assemblies connected to the housing 104 that engage the optics assembly cover 102 at multiple positions.

Referring again to FIG. 2, the ejection spring 204 pushes the optics assembly cover 102 away from the housing 104 when the retention system 106 is disengaged. The ejection spring 204 may comprise any suitable system for causing a displacement of the optics assembly cover 102, such as a coil spring, volute spring, leaf spring, piston, or the like. The ejection spring 204 may comprise any suitable material such as metal, plastic, or rubber capable of providing a displacement force to the optics assembly cover 102. The ejection spring 204 may comprise any suitable source of force, such as an explosive bolt, a pneumatic charge, an expanding gas, or other suitable mechanism adapted to push the cover 102 away from the housing 104.

The present ejection spring 204 may be attached to the housing 104 in any suitable manner. For example, in one embodiment, the ejection spring 204 may be housed in a chamber affixed to an exterior surface of the housing 104. In another embodiment, the ejection spring 204 may be incorporated into the retention system 106.

In the present embodiment, the ejection spring 204 comprises a single metal coil spring attached to the housing 104 such that it engages the optics assembly cover 102. Upon disengagement by the retention system 106, the ejection spring 204 acts on the optics assembly cover 102 with a force sufficient to eject the retained end of the optics assembly cover 102 up and away from the housing 104. In another embodiment, multiple ejection springs 204 may be positioned around the circumference of the housing 104.

The cutter 206 cuts the seal 110 when the optics assembly cover 102 is displaced. The cutter 206 may comprise any suitable system such as a knife, sharpened edge, or razor capable of breaking the seal 110 between the optics assembly cover 102 and the housing 104. The cutter 206 may also comprise any suitable material such as metal, plastic, or other material capable of cutting, tearing, slicing, or otherwise affecting the integrity of the seal 110.

The cutter 206 may be disposed in the housing 104 in any suitable manner. For example, in one embodiment, the cutter 206 may be positioned at any suitable angle in relation to the seal 110, such as at a 90 degree angle, a 45 degree angle and/or the like. Further, the cutter 206 may be attached to the housing 104 in any suitable manner such as via rivets, bolts, screws, welds, adhesives, or the like such that the cutter 206 can interface with the seal 110.

Figure 3:
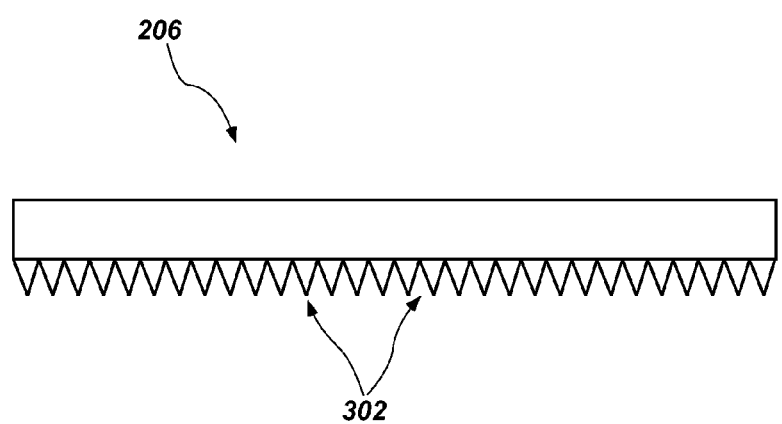
FIG. 3 representatively illustrates a cutter in accordance with an exemplary embodiment of the present invention.

For example, referring to FIGS. 2 and 3, in one embodiment, the cutter 206 comprises a metallic strip having at least one serrated edge 302. A non-serrated edge of the cutter 206 may be positioned within a tab 208 attached to the housing 104 such that the serrated edge is positioned adjacent to the seal 110. The tab 208 and the cutter 206 may further extend around the entire outer surface of the housing 104 and be located between the seal 110 and the housing 104.

Figure 4:
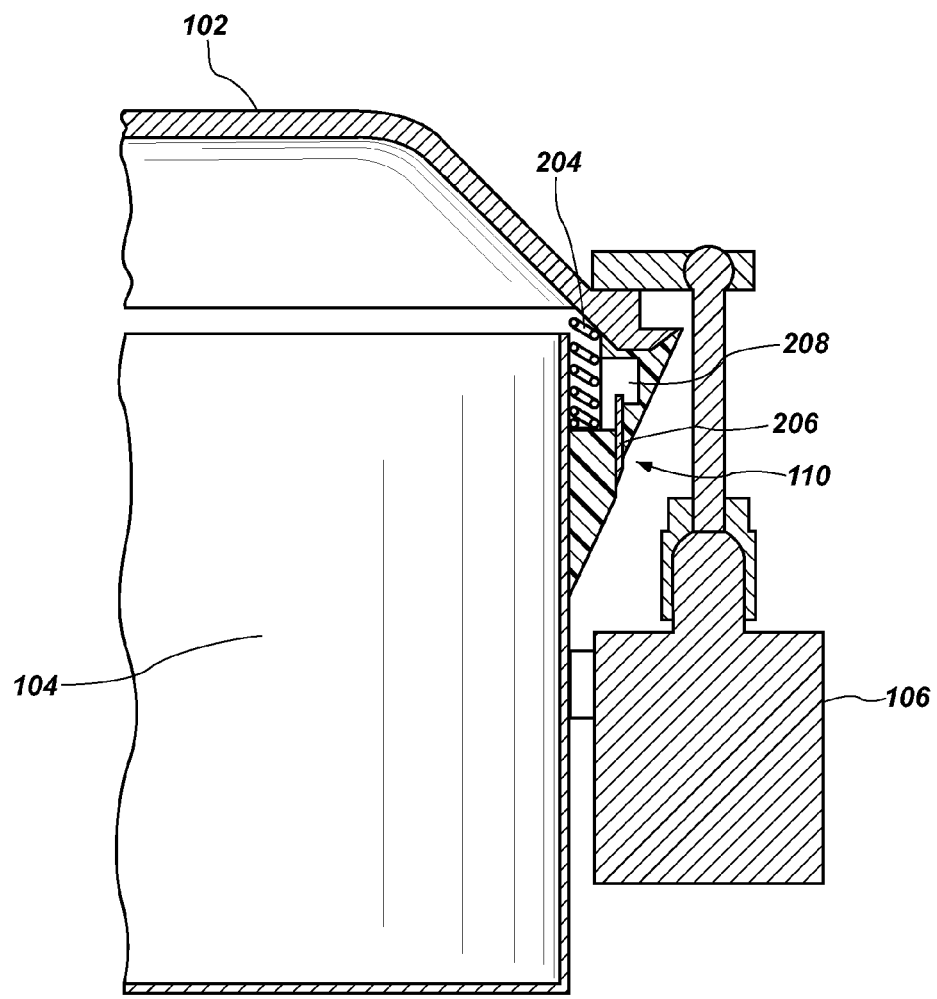
FIG. 4 representatively illustrates a cross-sectional view of a retention system in the disengaged position in accordance with an exemplary embodiment of the present invention.

In one embodiment, in response to a displacement of the optics assembly cover 102, the seal 110 may be brought into contact with the cutter 206, resulting in the cutting of the seal 110. The displacement of the optics assembly cover 102 provides the necessary force between the seal 110 and the cutter 206 to effectively destroy the integrity of the seal 110. Referring now to FIG. 4, in the present embodiment, the positioning of the cutter 206 may be related to the movement of the optics assembly cover 102 or the retention system 106. For example, during disengagement of the retention system 106, the ejection spring may extend the cutter 206 outwards into the seal 110 to facilitate the cutting the seal 110 and movement of the optics assembly cover 102 away from the housing 104.

The optics assembly cover 102 covers the open end of the housing 104 and protects the interior components of the optics assembly 100 from damage and debris. The optics assembly cover 102 may comprise any system for covering the housing 104, such as a lid, plate, or plug. The optics assembly cover 102 may also comprise any suitable material such as metal, plastic, rubber or other similar material capable of protecting the interior components. For example, referring to FIG. 1, in one embodiment, the optics assembly cover 102 comprises a plate-shaped ejectable metallic cover configured to fit snugly against the end of the housing 104.

The optics assembly cover 102 may be held against the housing by any suitable method, including at least partially by the retention system 106. For example, in the present embodiment, the optics assembly cover 102 is held against the housing in one location by the retention system 106 and a hinge positioned on the opposite side of the housing 104. The hinge provides a fixed point of rotation when the optics assembly cover 102 is displaced by the ejection spring 204. The hinge may be further configured to release the optics assembly cover 102 after is has rotated beyond a predetermined angle to eject the optics assembly cover 102 away from the optics assembly 100.

The seal 110 protects the region between the housing 104 and the optics assembly cover 102 and may comprise any system for preventing foreign object debris from passing through the joint 108 between the housing 104 and the optics assembly cover 102. The seal 110 may further be impermeable to moisture and/or air to hermetically seal the interior of the optics assembly 100 from ambient conditions. The seal 110 may comprise any suitable material, such as metal foil or plastic, that can be easily cut by the cutter 206 and still provide an adequate seal. For example, metal foils with decreasing thickness are easier to cut, tear, slice, or rip than thicker pieces of metal foil.

The seal 100 may be configured in any manner to cover the joint 108 between the housing 104 and the optics assembly cover 102. The seal 110 may comprise a strip of material with a varying length-to-width ratio. For example, in one embodiment, the strip may have a length of ten inches and a width of approximately one-half inch. In another embodiment, the strip may comprise a length of 22 inches and have a width of one inch. The seal 110 may also comprise any suitable shape such as rectangular, conical, circular, or the like.

The seal 110 may be affixed to the optics assembly 100 in any suitable manner. For example, a seal 110 comprising a plastic or other synthetic compound may be adhesively adhered to the housing 104 along one lengthwise end of the seal 110 and the other lengthwise end of the seal 110 may be adhered to the optics assembly cover 102. Alternatively, a seal 110 comprising a metal foil such as aluminum, stainless steel, nickel, or other metallic alloy may be soldered, welded, or brazed to the optics assembly 100.

In the present embodiment, the seal 110 comprises a metal foil including nickel with a length between fifteen and twenty-two inches, a width of approximately one inch, and a thickness between two and three thousandths of an inch. The nickel foil is configured into an oblong shape, such as the shape of a rainbow, when laid flat and results in a conical shape when the two opposing ends are brought together. The nickel foil is further configured to be soldered along one lengthwise end around the circumference of the housing 104 on one side of the joint 108. The opposite end of the nickel foil may then be soldered around the circumference of the optics assembly cover 102 on the other side of the joint 108.

In operation of one embodiment, the optics assembly 100 may be connected to or installed on a projectile and used to provide navigational information and/or help guide the projectile to its intended target. Prior to use, the optics assembly cover 102 may be secured to the end of the optics assembly housing 104 to protect the optics components contained within the housing 104. The optics assembly cover 102 may be secured to the housing 104 by the retention system 106 to selectively retain the optics assembly cover 102. The retention system 106 may be configured to retain the optics assembly cover 102 in place until being disengaged, for example manually, electronically, or pneumatically.

While the optics assembly cover 102 is in place, the joint 108 runs between the housing 104 and the optics assembly cover 102 along the perimeter of the housing 104. The seal 110 is affixed over the joint 108, which may prevent debris, air, or moisture from entering into the interior of the housing 104 where the optics assembly 100 components are located. The seal 110 is soldered to the optics assembly 100 such that approximately one-half of the seal 110 is below the joint 108 and one-half of the seal 110 is above the joint 108. More specifically, referring to FIGS. 1 and 2, one lengthwise portion of the seal 110 is soldered to the housing 104 and the opposite lengthwise portion of the seal 110 is soldered to the optics assembly cover 102.

In one embodiment, during or just prior to use, the retention system 106 is disengaged and an ejection spring 204 may be used to effect a displacement of the optics assembly cover 102. For example, the ejection spring 204 may be configured to propel the optics assembly cover 102 up and away from the housing 104, which exposes the optics assembly 100 components to the environment. In another embodiment, the optics assembly cover 102 is manually removed without the need of the ejection spring 204.

For the optics assembly cover 102 to be ejected from the optics assembly 100 as desired, the seal 110 may be cut. To cut the seal 110, the cutter 206 is affixed along the circumference of the housing 104 such that the cutter 206 is positioned under the seal 110. The cutter 206 may cut the seal 110 along its length in response to a displacement of the optics assembly cover 102. As the ejection of the optics assembly cover 102 is initiated, the seal 110 is brought into contact with the serrated edge 302 of the cutter 206. The relative movement of the seal 110 and the optics assembly cover 102 compared to the stationary position of the cutter 206 causes the serrated edge 302 to cut the seal 110.

The force applied to the optics assembly cover 102 by the ejection spring 204 is sufficient to drive seal 110 sufficiently deep enough into the serrated edge 302 to result in a substantial loss of integrity of the seal 110. For example, referring to Table 1 below, the force required to puncture the seal 110, shown below in pound force (lbf) varies based on the thickness of the seal (1 mil, 2 mil, and 3 mil) and the angle of cut of the cutter 206 (either straight (90 degrees), or 45 degrees). Each seal punctured comprised a 4-inch sample.

TABLE 1

| 1 mil straight cut | 2 mil straight cut | 3 mil straight cut | 1 mil 45 degree cut |
|---|---|---|---|
| 23.48427 | 75.9185 | 91.3277 | 17.94877 |
| 23.01179 | 58.41536 | 83.38148 | 16.86959 |
| 19.83331 | 55.22077 | 96.15985 | 13.81996 |
| 18.85077 | 94.38805 | 104.32082 | |
| 19.53801 | 73.12659 | 81.0191 | |
| 16.6065 | | | |
| 25.98625 | | | |
| 17.25079 | | | |
| 19.94069 | | | |

As shown in Table 1, less force is required to puncture a 1 mil thick seal 110 when the cut is affected at a 45 degree angle as opposed to at a 90 degree angle. Also, less force is required to puncture a thinner (1 mil) seal 110, as opposed to a thicker (2 mil or 3 mil) seal 110. After the seal 110 has been cut, a portion of the seal remains attached solely to the housing 104 with the remainder of the seal 110 attached solely to the optics assembly cover 102.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation as used in this description are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A seal for a joint between a first surface and a second surface, comprising:
    an oblong strip positioned over the joint, wherein the oblong strip is configured to seal a region between the first surface and the second surface; and
    a cutter disposed between the first surface and the oblong strip, wherein the cutter is configured to cut the oblong strip in response to a displacement of the second surface away from the first surface.

2. A seal according to claim 1, wherein:
    a first lengthwise edge of the oblong strip is affixed to the first surface; and
    a second lengthwise edge of the oblong strip is affixed to the second surface.

3. A seal according to claim 2, wherein the oblong strip comprises a metal foil.

4. A seal according to claim 3, wherein the first lengthwise edge of the metal foil is soldered to the first surface and the second lengthwise edge of the metal foil is soldered to the second surface.

5. A seal according to claim 1, wherein the cutter comprises a second strip comprising a serrated edge.

6. A seal according to claim 1, wherein the oblong strip is impermeable to at least one of moisture and air.

7. A seal according to claim 1, further comprising:
    a retention system attached to the first surface, wherein the retention system is configured to selectively retain the second surface to the first surface; and
    a spring engaging the second surface, wherein the spring is configured to displace the second surface.

8. A seal according to claim 7, wherein the spring is contained within the retention system.

9. A seal for an optics assembly housing and a removable cover, comprising:
    an oblong metal foil positioned over a junction between the optics assembly housing and the removable cover, wherein the metal foil is configured to seal a region between the optics assembly housing and the removable cover; and
    a cutter attached to the optics assembly housing, wherein the cutter is configured to cut the metal foil in response to a displacement of the removable cover away from the optics assembly housing.

10. A seal according to claim 9, wherein:
    a first lengthwise edge of the metal foil is affixed to the optics assembly housing; and
    a second lengthwise edge of the metal foil is affixed to the removable cover.

11. A seal according to claim 10, wherein the first lengthwise edge is soldered to the optics assembly housing and the second lengthwise edge is soldered to the removable cover.

12. A seal according to claim 9, wherein the cutter comprises a strip configured with a serrated edge.

13. A seal according to claim 9, wherein the metal foil is impermeable to at least one of moisture and air.

14. A seal according to claim 9, further comprising:
    a retention system attached to the optics assembly housing, wherein the retention system is configured to selectively retain the removable cover to one end of the optics assembly housing; and
    a spring engaging the removable cover, wherein the spring is configured to displace the removable cover.

15. A seal according to claim 14, wherein the spring is contained within the retention system.

16. A method for selectively sealing a joint between a first surface and a second surface, comprising:
    attaching a curter to the first surface;
    affixing an oblong shaped metal foil over the joint and the cutter, wherein the metal foil is adapted to seal a region between the first surface and the second surface; and
    cutting the metal foil with the cutter, wherein the cutter is configured to cut the metal foil in response to a displacement of the second surface away from the first surface.

17. A method for selectively sealing a joint according to claim 16, wherein the cutter comprises a strip configured with a serrated edge.

18. A method for selectively sealing a joint according to claim 16, wherein:
    a first lengthwise edge of the metal foil is affixed to the housing; and
    a second lengthwise edge of the metal foil is affixed to the removable cover.

19. A method for selectively sealing a joint according to claim 16, wherein the first lengthwise edge is soldered to the first surface and the second lengthwise edge are soldered to the second surface.

20. A method for selectively sealing a joint according to claim 16, further comprising:
    securing the first surface to the second surface with a retention system, wherein the retention system is configured to selectively retain at least a portion of the second surface when engaged; and
    displacing the second surface by disengaging the retention system.

* * * * *